Patented Jan. 30, 1934

1,945,052

UNITED STATES PATENT OFFICE 1,945,052

GLASS PRODUCT AND METHOD OF MANUFACTURING SPONGE-LIKE GLASS

Bernard Long, Paris, France, assignor to Societe Anonyme Des Manufactures Des Glaces & Produits Chimiques De Saint-Gobain, Chauny & Cirey, Paris, France No Drawing. Application June 17, 1933, Serial No. 676,403, and in France June 22, 1932

7 Claims. (Cl. 49—77)

This invention relates to glass and siliceous products, and refers more particularly to methods of producing sponge-like, or multicellular glass.

An object of this invention is to produce an inexpensive and durable sponge-like glass or siliceous material, which may be utilized as a building material and which has good heat and sound insulating properties.

Another object is the provision of a method of making sponge-like or multicellular glass having a very low apparent specific gravity or density.

It has been found that it is possible to produce sponge-like or multicellular glass of low apparent specific gravity and high heat and sound insulating properties by subjecting a glass or siliceous mixture to a suitable heat treatment after fusion, if certain gas producing substances are incorporated in the glass.

In one preferred form of the present invention, I melt a batch containing silica or sand, alkali metal salts and other metal compounds such as zinc oxide, aluminium hydroxide, together with boric acid or borax and carbonaceous materials.

The glass material after fusion may either be cooled down slowly to the softening temperature, which ranges from 500° C. to 700° C., and maintained at that temperature until sponge-like glass is formed; or it may be cooled rapidly much lower than the softening temperature and then returned slowly to that temperature, the desirability of these processes depending upon different conditions. The resultant product is a sponge-like, cellular, porous glass, in which the various pores or cells are devoid of communication with each other.

The invention will appear more clearly from the following examples illustrating preferred modifications of the inventive idea.

Following mixtures may be used for the production of glass:

|   | Parts by weight |
|---|---|
| 1. Sand | 100 |
| Borax | 94 |
| Zinc oxide | 17 |
| Aluminium hydrate | 5 |
| Carbon | 8 |

This mixture is fused in the usual way until a molten glass material is obtained. The glass is then cooled as said above, the softening temperature of this material being about 600° C. The solid article has an apparent specific gravity of about 1.68.

|   | Parts by weight |
|---|---|
| 2. Sand | 100 |
| Sodium carbonate | 32 |
| Boric acid | 76 |
| Aluminium hydrate | 5.5 |
| Titanium oxide | 5 |
| Ammonium chloride | 1.5 |
| Finely pulverized wood-carbon | 0.7 |

The liquid produced by the fusion of the above substances is cooled rapidly much lower than the softening temperature. Then it is again heated to a temperature of about 700° C., which is approximately equal to its softening temperature, and is maintained at that temperature for some time. The resulting sponge-like or multicellular glass has an apparent specific gravity which is substantially equal to 0.80.

Titanium oxide increases the swelling and thus considerably diminishes the specific weight of the finished solid article.

The exterior pressure may also be gradually diminished during the time while the glass is maintained at the softening temperature.

In most instances, the density of ordinary glass composed of certain substances and the apparent specific gravity of multicellular glass composed of the same substances, are a matter of common knowledge. If, for instance, a glass having a density of 2.5 may be transformed into multicellular glass having an apparent specific gravity of 1.25, molds having twice the volume of ordinary molds should be used. If it is desired to produce multicellular glass blocks having the volume of 1.5 cubic decimeters, the original glass liquid is first poured into molds having a volume of 0.75 cubic decimeters. Then the glass is reheated in other molds having a double volume (i. e. a volume of 1.5 cubic decimeters), and is subjected there to the swelling process, which results in the production of multicellular glass having an apparent specific gravity of 1.25.

Sponge-like glass produced by the above-described methods, comprises a plurality of adjacent separate cells, which do not communicate with each other. This glass has an apparent specific weight or density, which is usually much less than 1.8 and it is particularly noted for its heat and sound insulating properties. It can be used for a variety of different purposes, for instance, it can be formed into bricks and tiles and thus be used in the building industry. Sponge-like glass having a density, which is less than 1, may be used as a float for fishing  The finished article can be easily worked on, it may be bored or drilled and its surfaces may be ground. The ground surfaces have numerous cavities which are useful in forming a permanent connection between a glass article and lime, cement and other adhesive substances.

What is claimed is:

1. A method of manufacturing sponge-like glass, comprising incorporating in a glass batch, gas evolving substances and subsequently maintaining the glass material close to its softening temperature and sufficiently below the fusion temperature to cause said gas evolving substances to evolve considerable quantities of gas and form a sponge-like structure.

2. A method of manufacturing sponge-like glass, comprising incorporating in a glass batch a carbonaceous substance and boric acid and subsequently maintaining the glass material close to its softening temperature and sufficiently below the fusion temperature to cause said glass material to form a sponge-like structure.

3. A method of manufacturing sponge-like glass, comprising incorporating in a glass batch a carbonaceous substance, boric acid and zinc oxide and subsequently maintaining the glass material close to its softening temperature and sufficiently below the fusion temperature to cause said glass material to form a sponge-like structure.

4. A method of manufacturing sponge-like glass, comprising incorporating in a glass batch a carbonaceous substance, boric acid and titanium oxide and subsequently maintaining the glass material close to its softening temperature and sufficiently below the fusion temperature to cause said glass material to form a sponge-like structure.

5. A method of manufacturing sponge-like glass, comprising incorporating in a glass batch gas evolving substances, cooling said glass material, rapidly and subsequently heating said glass material slowly to its softening temperature to cause said glass material to form a sponge-like structure.

6. A method of manufacturing sponge-like glass, comprising incorporating in a glass batch gas evolving substances, cooling said glass material rapidly, subsequently heating said glass material slowly to its softening temperature and diminishing the exterior pressure gradually during the time while the glass is maintained at the softening temperature to cause said glass material to form a sponge-like structure.

7. As an article of manufacture, a sponge-like multicellular glass having a number of cells which are devoid of communication with each other and comprising boric acid and a carbonaceous substance.

BERNARD LONG.